US005303562A

United States Patent [19]

Bahel et al.

[11] Patent Number: 5,303,562

[45] Date of Patent: Apr. 19, 1994

[54] CONTROL SYSTEM FOR HEAT PUMP/AIR-CONDITIONING SYSTEM FOR IMPROVED CYCLIC PERFORMANCE

[75] Inventors: Vijay Bahel, Sidney; Hank Millet, Piqua; Mickey Hickey, Sidney; Hung Pham, Dayton; Gregroy P. Herroon, Piqua, all of Ohio

[73] Assignee: Copeland Corporation, Sidney, Ohio

[21] Appl. No.: 8,525

[22] Filed: Jan. 25, 1993

[51] Int. Cl.[5] .............................................. F25B 41/04

[52] U.S. Cl. ...................................... 62/222; 62/158

[58] Field of Search .................. 62/160, 222, 223, 224, 62/225, 204, 205, 210, 211, 212, 158, 157, 231

[56] References Cited

U.S. PATENT DOCUMENTS

| | | | |
|---|---|---|---|
| 3,927,712 | 12/1975 | Nakayama | 165/12 |
| 4,046,532 | 9/1977 | Nelson | 62/215 |
| 4,136,730 | 1/1979 | Kinsey | 165/12 |
| 4,137,057 | 1/1979 | Piet et al. | 62/89 |
| 4,232,530 | 11/1980 | Mueller | 62/160 |
| 4,267,702 | 5/1981 | Houk | 62/115 |
| 4,271,898 | 6/1981 | Freeman | 165/16 |
| 4,286,438 | 9/1981 | Clarke | 62/216 |
| 4,365,983 | 12/1982 | Abraham et al. | 62/81 |
| 4,449,375 | 5/1984 | Briccetti | 62/89 |
| 4,460,123 | 7/1984 | Beverly | 236/46 R |
| 4,495,779 | 1/1985 | Tanaka et al. | 62/223 X |
| 4,507,934 | 4/1985 | Tanaka et al. | 62/210 |
| 4,535,607 | 8/1985 | Mount | 62/201 |
| 4,538,422 | 9/1985 | Mount et al. | 62/201 |
| 4,549,404 | 10/1985 | Lord | 62/224 |
| 4,598,764 | 7/1986 | Beckey | 165/29 |
| 4,620,424 | 11/1986 | Tanaka et al. | 62/222 |
| 4,674,292 | 6/1987 | Ohya et al. | 62/223 |
| 4,682,473 | 7/1987 | Rogers, III | 62/89 |
| 4,684,060 | 8/1987 | Adams et al. | 236/11 |
| 4,686,835 | 8/1987 | Alsenz | 62/223 |
| 4,735,054 | 4/1988 | Beckey | 62/93 |
| 4,751,825 | 6/1988 | Voorhis et al. | 62/234 |
| 4,790,142 | 12/1988 | Beckey | 62/115 |
| 4,848,099 | 7/1989 | Beckey et al. | 62/212 |
| 4,850,198 | 7/1989 | Helt et al. | 62/93 |
| 4,873,836 | 10/1989 | Thompson | 62/158 |
| 4,893,480 | 1/1990 | Matsui et al. | 62/225 |
| 4,944,160 | 7/1990 | Malone et al. | 62/180 |
| 4,967,567 | 11/1990 | Proctor et al. | 62/127 |
| 4,977,751 | 12/1990 | Hanson | 62/81 |
| 5,224,354 | 7/1993 | Ito et al. | 62/222 X |

*Primary Examiner*—Harry B. Tanner
*Attorney, Agent, or Firm*—Harness, Dickey & Pierce

[57] ABSTRACT

The microprocessor-based control system optimizes efficiency of the ON/OFF cycle by shutting the expansion valve fully closed at the beginning of each OFF cycle to maintain system pressure differential. At the beginning of each ON cycle the expansion valve is opened to an initial larger than average of three openings to allow the system to quickly reach steady state operating levels. Thereafter, the valve opening is reduced to an average of the last three steady state settings. After a predetermined time, control of the valve opening is passed to an adaptive control algorithm which adjusts the valve setting for optimized performance during steady state.

14 Claims, 10 Drawing Sheets

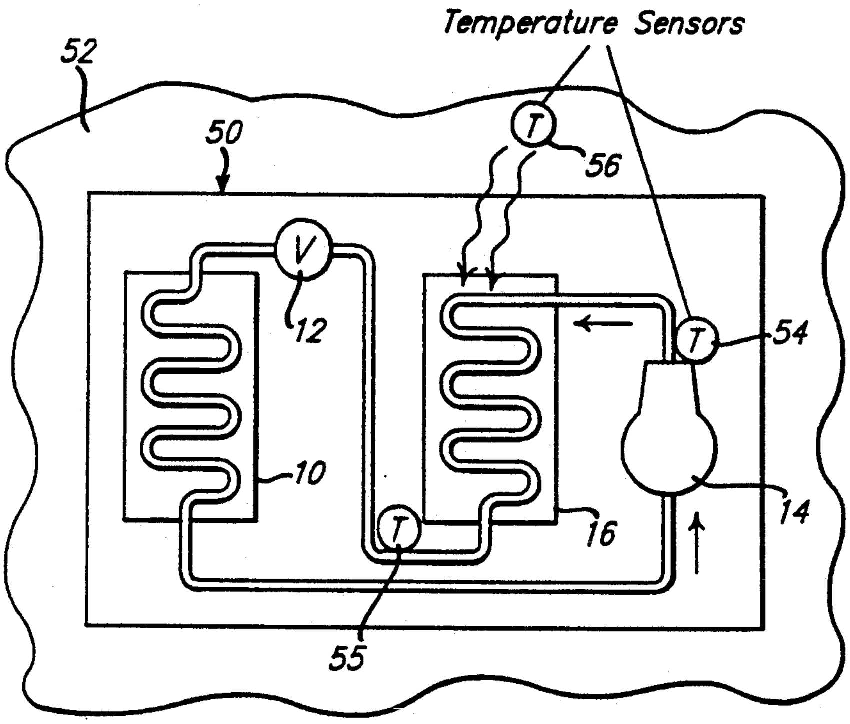
FIG. 6.
FIG. 7.
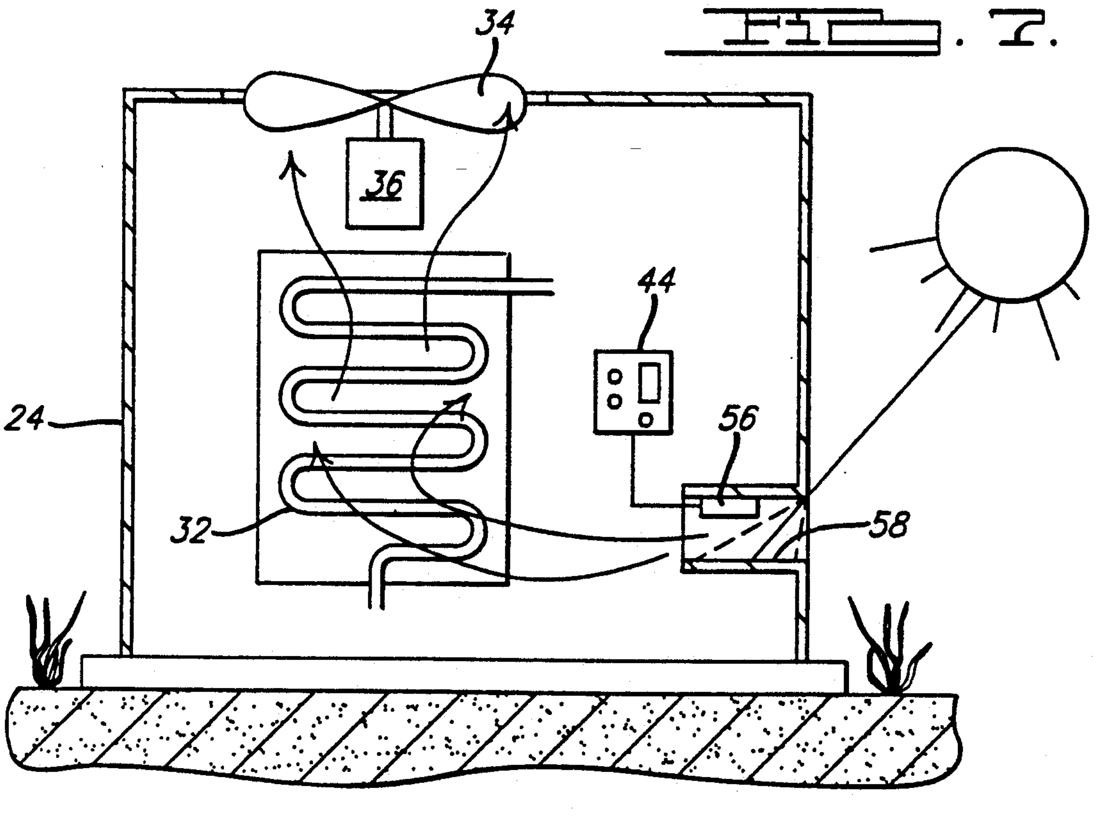

CONTROL SYSTEM FOR HEAT PUMP/AIR-CONDITIONING SYSTEM FOR IMPROVED CYCLIC PERFORMANCE

BACKGROUND AND SUMMARY OF THE INVENTION

The present invention relates generally to electronic control systems for air conditioners, heat pumps and refrigeration equipment. More particularly, the invention relates to an apparatus and method utilizing digital circuitry to control a heat pump during its normal operating cycle in order to provide optimum system efficiency and improved cyclic performance.

Whether operating as an air-conditioning system or as a heat pump system, the basic refrigeration cycle meters refrigerant through a closed system in a precisely controlled manner. The refrigerant cools by evaporation in a heat exchanger commonly called an evaporator coil. The refrigerant is metered to the evaporator coil through an orifice sometimes called an expansion valve. Ideally, a refrigeration system should meter just enough refrigerant into the evaporator coil so that the refrigerant extracts heat throughout the length of the coil as it evaporates. Due to changing dynamics of the system, changes in thermostat settings and changes in load from sun, wind and so forth, the optimal flow through the expansion valve will need to be varied as the system operates.

The precise control of the expansion valve during steady state operation, to achieve optimal efficiency during steady state operation, has been the subject of much study in the continued effort to improve energy efficiency. However, a typical air-conditioning system or heat pump system does not operate continuously in steady state. Rather air-conditioning and heat pump systems are cycled ON and OFF numerous times throughout the day, at duty cycles which can vary. Throughout each ON/OFF cycle a certain amount of energy is lost simply due to the inefficiencies of start-up. Energy is added to bring the system up to steady state during each start-up of the system following each shutdown. These start-up losses take a considerable toll in terms of overall system efficiency and energy consumption.

Conventionally, air-conditioning and heat pump systems are designed for optimal efficiency at steady state. In other words, the expansion valve orifice size, heat exchanger coil sizes, compressor size, operating pressures, flow rates and the like are determined with the thermodynamics of the steady state system in mind. During start-up, flow rates and pressures are initially lower, the compressor is not up to steady state capacity, and so forth, and thus the refrigeration cycle does not operate at optimal efficiency.

The present invention addresses this shortcoming of conventional systems through the use of a microprocessor-based control system and digitally controllable expansion valve. The expansion valve opens the valve orifice to a greater diameter than normal on the initiation of the start-up sequence. This enables rapid transfer of the refrigerant charge to the coil and significantly improves efficiency. After the initial start-up setting the valve orifice is reduced to the steady state position in a precisely controlled way. At the end of the operating cycle, the expansion valve is closed shut to prevent operating pressure differential from being lost. The result is a state-of-the-art heat pump system which offers high efficiency and longer component life.

For a more complete understanding of this invention, its objects and advantages, reference may be had to the following specification and appended claims, taken in conjunction with the accompanying drawings.

BRIEF DESCRIPTION OF THE DRAWINGS

FIG. 6 is a schematic representation illustrating the sensor arrangement utilized by the invention;

FIG. 7 is a cross-sectional view showing a preferred manner of positioning the ambient outdoor temperature sensor of the invention to reduce the effects of radiant heating;

DESCRIPTION OF THE PREFERRED EMBODIMENT

The present invention provides an apparatus and method for optimizing the refrigeration cycle employed in air conditioners, heat pumps and refrigeration equipment. The system employs a microprocessor-based control system and a unique complement of sensors and an electronically controlled expansion valve. To illustrate the principles of the invention, a heat pump system capable of providing both heating and cooling will be described. A heat pump system of the type described might be suitable for heating and cooling a commercial or residential building, although the principles of the invention are not limited to commercial and residential heating and cooling and are applicable to all pumped heat transfer systems.

Figure 1:
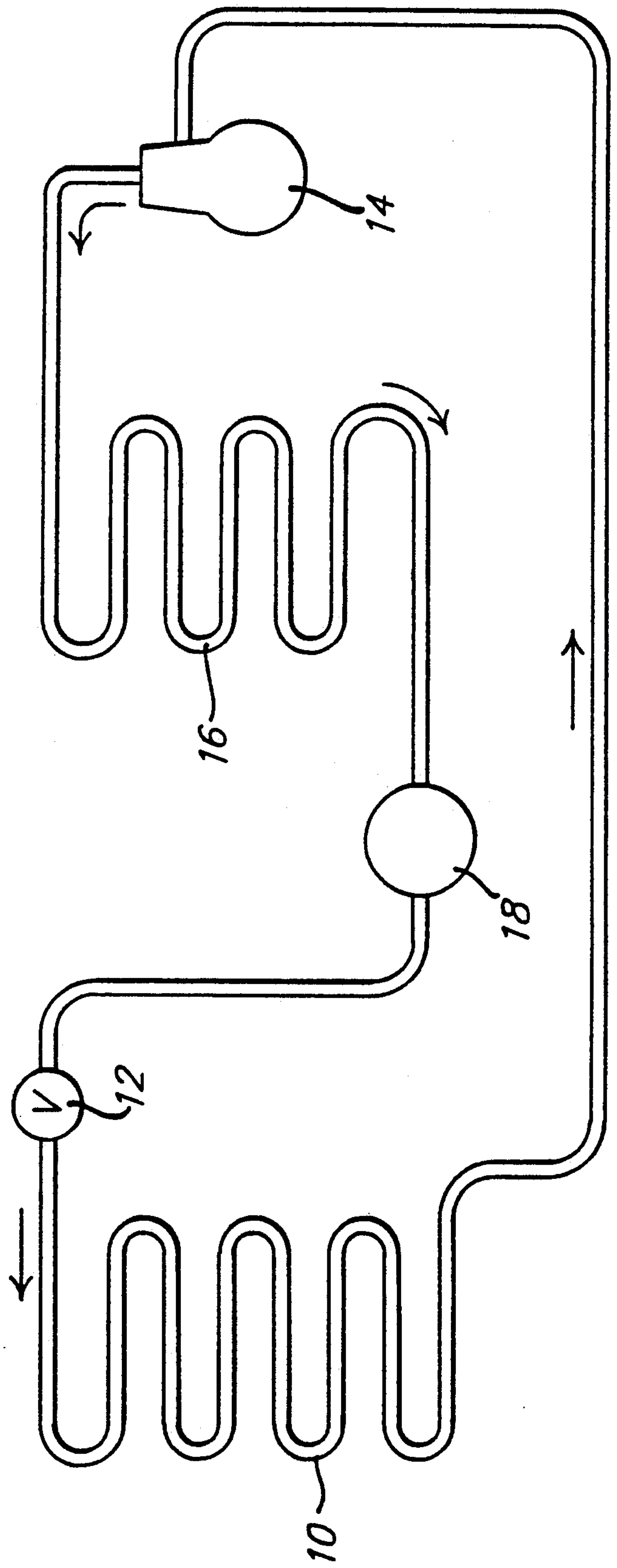
FIG. 1 is a schematic representation of the basic refrigeration cycle.

However, before giving a detailed description of the presently preferred embodiment, a brief review of the refrigeration cycle will be given. That cycle will be described in connection with a basic heat pump system illustrated schematically in FIG. 1.

The heat pump cycle uses the cooling effect of evaporation to lower the temperature of the surroundings near one heat exchanger (the evaporator) and it uses the heating effect of high pressure, high temperature gas to raise the temperature of the surroundings near another heat exchanger (the condenser). This is accomplished by releasing a refrigerant under pressure (usually in the liquid phase) into a low pressure region to cause the refrigerant to expand into a low temperature mixture of gas and liquid. Commonly, this low pressure region comprises an evaporator coil, such as evaporator coil 10. The refrigerant mixture once in the evaporator coil 10 is exposed to the high temperature ambient air of the region desired to be cooled. Evaporation of refrigerant from liquid to gas absorbs heat from the ambient air and thereby cools it.

Release of refrigerant into the low pressure evaporator coil is usually metered by a restricted orifice or valve commonly called an expansion valve 12. There are a wide variety of different types of expansion devices in use today, ranging from simple nonadjustable capillary tubes to electrically adjustable valves such as pulse width modulated valves. The refrigerant at the outlet of the evaporator coil is compressed back into a high pressure state by compressor 14 and condensed into a liquid phase by condenser 16 to be used once again. In a heat pump application, the condensing of high pressure gas into a liquid phase supplies heat to the surroundings.

Having reviewed the basic principles of the refrigeration or heat pump cycle, a presently preferred embodiment of the invention will be given. Although the invention can take many forms, it will be described in conjunction with FIG. 2 wherein an air conditioner or heat pump system is depicted generally at 20. The system includes an indoor unit 22, a room unit or thermostat unit 23 and an outdoor unit 24. The indoor unit includes an indoor coil or heat exchanger 26 and an indoor fan 28. The indoor fan is preferably driven by a variable speed motor 30. The indoor fan and coil are situated using suitable duct work so that the fan forces ambient indoor air across the indoor coil at a rate determined by the speed of the variable speed motor.

The outdoor unit includes an outdoor coil or heat exchanger 32 and an outdoor fan 34 driven by suitable motor 36. In the heating mode of the heat pump this outdoor coil functions as the evaporator. Preferably the outdoor unit comprises a protective housing which encases the outdoor coil and outdoor fan so that the fan will draw ambient outdoor air across the outdoor coil to improve heat transfer. The outdoor unit also typically houses a compressor 38.

Figure 2:
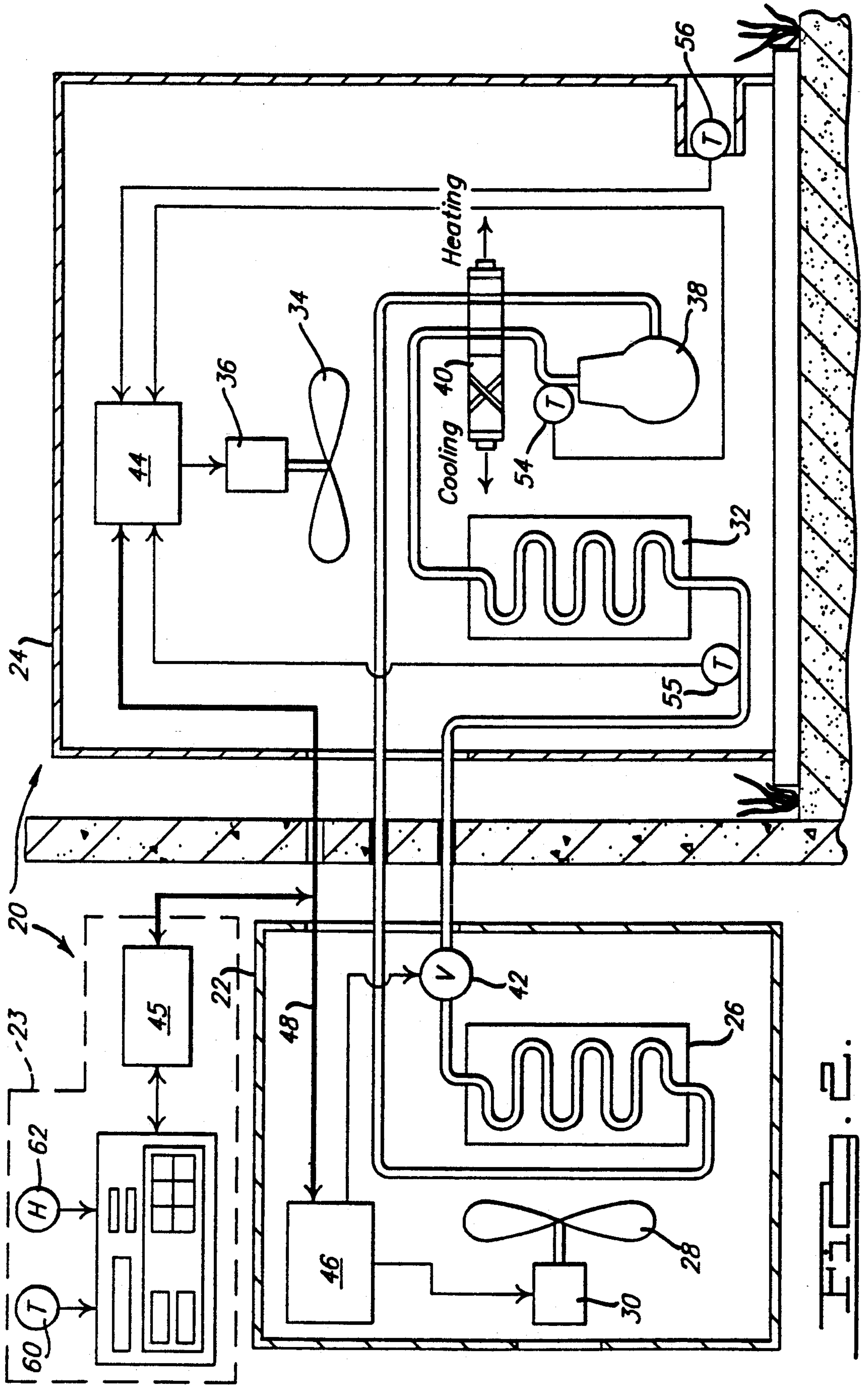
FIG. 2 is a schematic diagram of a preferred embodiment of the refrigeration control system of the invention, illustrated in a heat pump application.

The system illustrated in FIG. 2 is a so-called "heat pump" system because it can be used for both cooling and heating, by simply reversing the function of the indoor coil and the outdoor coil. This is done with a four-way reversing valve 40. Referring to FIG. 2, when the four-way valve is switched to the COOLING position (shown), the indoor coil functions as the evaporator and the outdoor coil functions as the condenser. When four-way valve is set to the HEATING position (the alternate position), the functions of the coils are reversed. The indoor coil functions as the condenser coil and the outdoor coil functions as the evaporator coil.

In addition to the indoor and outdoor coils and the compressor, the present system also uses an electronically controllable expansion valve (EXV) 42. In the presently preferred embodiment the expansion valve is a continuously variable (or incrementally variable) stepper motor valve which can be adjusted electronically to a wide range of orifice sizes or valve openings, ranging from fully open to fully closed. Although it is possible to implement the control system of the invention with other types of electrically controlled valves, pulse width modulated valves being an example, the stepper motor valve is presently preferred because it provides ripple-free operation and because it is more trouble-free. The stepper motor valve only needs to move or cycle when an orifice size adjustment is made. This may happen several times during a typical operating sequence (e.g., several times per hour). In contrast, the pulse width modulated valve cycles continuously at high frequency during the entire operating sequence.

The presently preferred system for improving cyclic performance is a microprocessor-based system which gathers data from various sensors and which, among other things, determines the proper setting of the expansion valve based on the data gathered. More specifically, the presently preferred embodiment utilizes three interconnected microprocessor-based control units 44, 45 and 46. Control unit 44 is associated with the outdoor unit 24 and control unit 46 is associated with the indoor unit 22. In addition, the room unit or thermostat unit 23 may also include a microprocessor-based control unit 45. Preferably, all three microprocessor-based control units are linked together via a suitable communication link 48 such as a parallel or serial communication link. The outdoor control unit 44 is in part responsible for data collection while the indoor control unit 46 is responsible for: ON/OFF cycling of system, modulating the indoor fan speed, control of expansion valve, start-/termination of demand defrost malfunction detection and performing system diagnostic functions.

Figure 3:
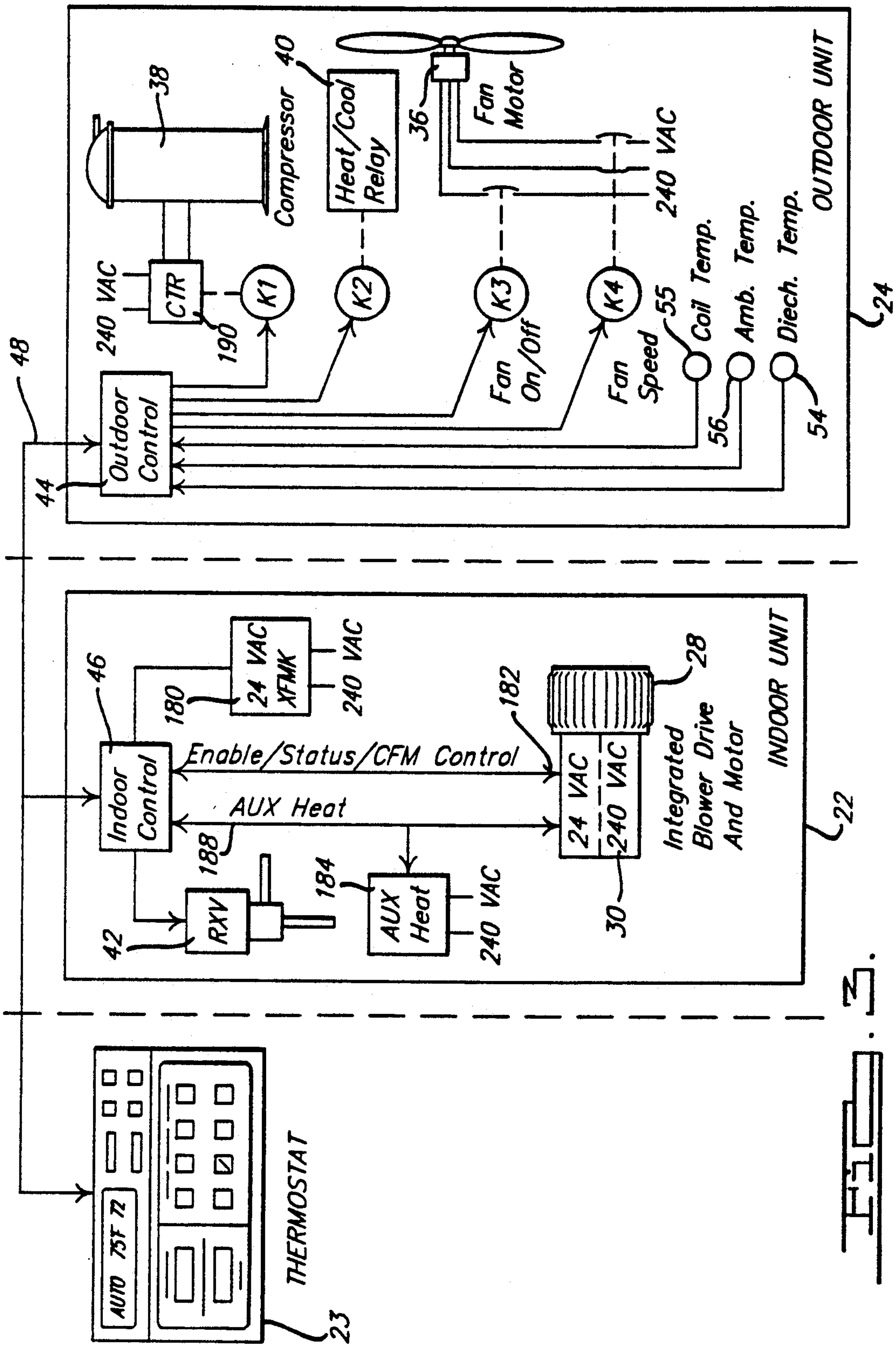
FIG. 3 is a schematic diagram of the control system of the present invention.

For convenience, the microprocessor-based control system used in implementing the refrigeration system of FIG. 2 is again shown substantially in FIG. 3. Specifically, the indoor unit 22, room unit or thermostat unit 23 and outdoor unit 24 are interconnected by communication link 48. Preferably communication link 48 is a four wire bus supplying AC power and ground to all three units and also providing a pair of serial communication data lines. The indoor unit 22, room unit 23 and outdoor unit 24 each have a microprocessor-based control unit which communicates with the other units over the communication link. In FIG. 3 the microprocessor-based control units 44 and 46 have thus been illustrated. The room unit 23 also includes a microprocessor-based control unit. The details have been omitted from FIG. 3 to simplify the illustration.

Also associated with the indoor unit 22 is the indoor fan or blower 28, which includes an integrated drive and variable speed motor 30. The presently preferred embodiment uses a motor which requires 240 VAC. A step-down transformer 180 is provided on the indoor unit for this purpose. Motor 30 receives its operating control instructions from and supplies status signals to the indoor control unit 46 at 5 VDC line levels over motor communication path 182.

The presently preferred embodiment uses electric resistance heaters to supply auxiliary heat. Indoor control unit 46 is responsible for determining when to turn the auxiliary heat ON and OFF. This signal is supplied at 24 VAC logic levels. The indoor control unit 46 also supplies 24 VDC logic signals to control the expansion valve 42.

The outdoor unit also supplies and receives a number of different control signals at 24 VAC logic levels via the paths illustrated. For example, outdoor control unit 44 supplies the ON/OFF signal to compressor relay K1. This relay in turn energizes the compressor contactor 190. The outdoor control unit 44 similarly supplies ON/OFF control signals to the heat/cool relay K2, which switches the reversing valve 40 as described above to place the system in either the HEATING or COOLING mode. The outdoor control unit supplies logic signals to the fan ON/OFF relay K3 and the fan speed relay K4. These relays in turn control the outdoor fan motor 36. In the presently preferred embodiment the outdoor fan motor 36 is a two speed motor. Outdoor control unit 44 also receives logic level data from the outdoor sensors, such as first temperature sensor 55, which measures the temperature of the outdoor coil, second temperature sensor 56, which measures the ambient or environment air temperature and discharge temperature sensor 54, which measures the discharge temperature of compressor.

Figure 4:
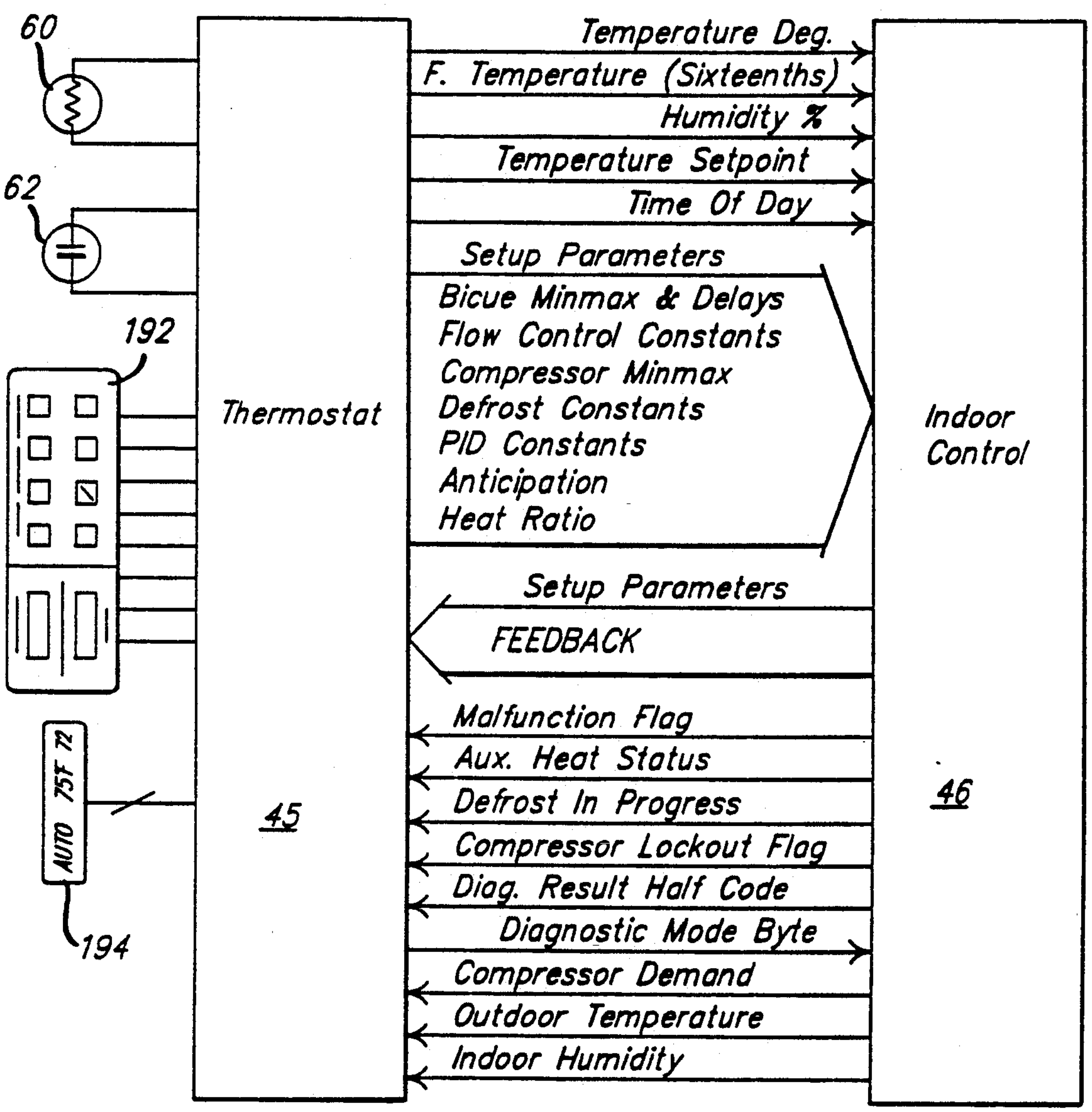
FIGS. 4 and 5 are detailed schematics illustrating the communication between the various microprocessors.
Figure 5:
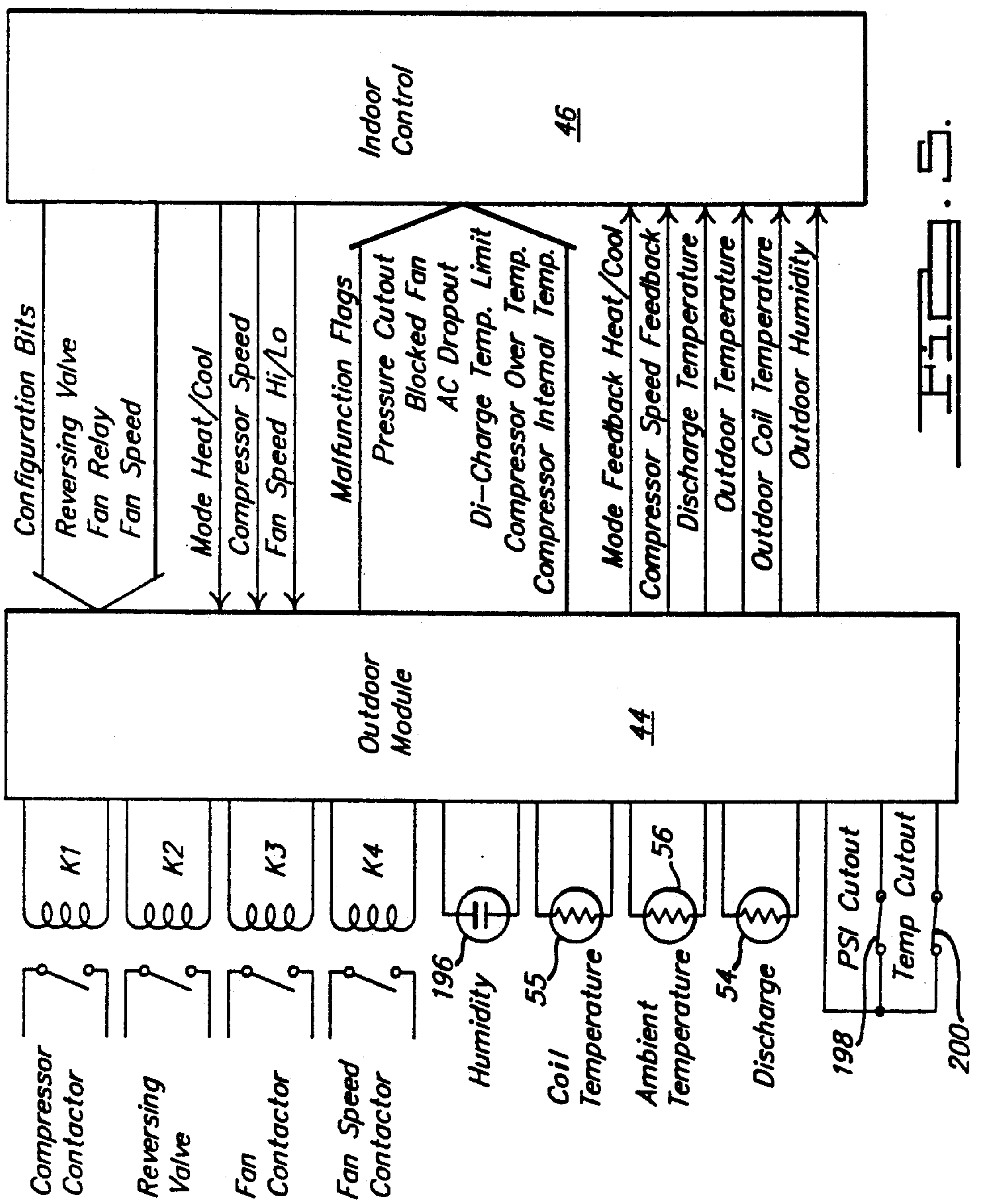

Referring to FIGS. 4 and 5, the microprocessor-based control units 44, 45 and 46 are shown in somewhat greater detail to show the types of signals which are communicated between the units during operation. In FIG. 4 the room unit control unit 45 is shown together with its associated keypad 192 and display 194. The keypad is coupled to the room unit control unit 45 via an eight line parallel data bus. The display is similarly coupled via a 36 line parallel data bus. Note the indoor temperature sensor 60 and indoor humidity sensor 62 are also coupled to the room unit control unit 45. A humidity sensor 196 may also be employed in the outdoor unit so that outdoor humidity can be measured if desired. To protect the outdoor unit, a pressure cutout 198 and a temperature cutout 200 are provided.

Figure 11:
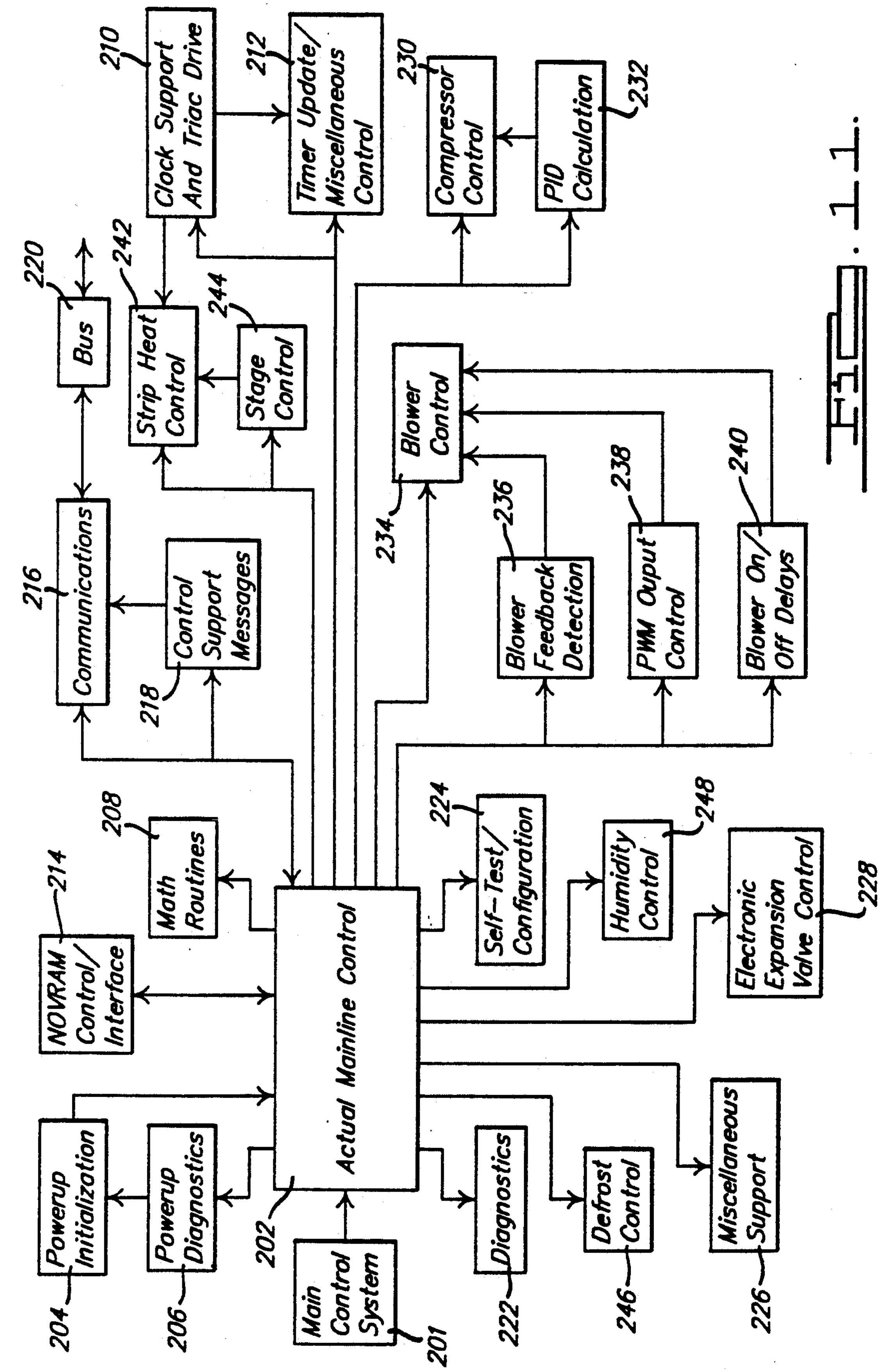
FIG. 11 is a software block diagram illustrating the presently preferred microprocessor-based control system.

The indoor control unit 46 functions as the master, controlling the overall system performance and much of the communication among the three control units. FIG. 11 is a software block diagram illustrating the functional software elements which comprise the present control system. Because the indoor control unit functions as the master in the presently preferred embodiment, many of the software modules of FIG. 11 reside in and are performed by the indoor control unit 46. Of course, from a system standpoint, any one of the microprocessor-based modules could serve as the master. In addition, the software functions depicted in FIG. 11 could be distributed across or shared by all three control units. Thus the specific allocation of certain functions to certain ones of the control units adopted by the present embodiment should not be viewed as a limitation upon the scope of the claims.

Referring to FIG. 11, at the heart of the software control system is the mainline control block 202. This block or module interfaces, either directly or indirectly, with each of the remaining blocks or modules. The mainline block 202 is supervised by the main control system block 201, which supplies the global system performance requirements. The mainline control block is responsible for effectuating the instructions of the main control system by interfacing with the other modules. For example, the power-up initialization and power-up diagnostics blocks are called by the mainline control block during initial power-up. The mainline control block has access to a math routines block 208 which is called upon anytime math calculations take place. Similarly, mainline control block 202 has access to the clock support and triac drive block 210 and the timer update/miscellaneous control block 212, which are used anywhere timing of events is involved.

The system is adaptive, in that it is capable of continuously updating parameters during normal operation. At initial power-up, however, the system uses preset starting parameters which are stored in a nonvolatile RAM or NOVRAM memory that is accessed via the NOVRAM control/interface block 214. The nonvolatile RAM may also store other numerical values such as constants which are not ordinarily altered during system operation. The use of nonvolatile RAM for this purpose is quite advantageous, since it allows a standardized hardware system to be custom programmed in the factory before shipment. This allows a more or less standard control module package to be used for a wide range of different heating and cooling systems by simple in factory programming. This results in a considerable cost savings.

Communications and message handling is provided by the communications block 216 and the control support messages block 218. These blocks implement the communication protocol described in Tables I–III. The actual details regarding the manner in which messages are placed on the communication link are handled by the bus block 220. System diagnostics are performed by block 222. If desired, the system may be programmed to perform self-tests and self-configuration. This is performed by block 224. In addition, any miscellaneous support functions which do not fit the other described categories may be called by the mainline control block. For illustration purposes, the miscellaneous support block 226 is thus shown.

Mainline control block 202 is further responsible for the important functions of controlling the refrigeration system components, the indoor fan and any auxiliary heating equipment. With respect to the refrigeration system components, an electronic expansion valve control block 228 is provided. This block is responsible for determining and effecting the setting of the expansion valve. Similarly, the compressor control block 230 is provided for turning the compressor ON and OFF via relay K1. A PID algorithm or other suitable control algorithm implemented in block 232 provides the adaptive control by which the system updates its parameters during operation.

Regarding the fan speed control, the blower control block 234 receives instructions from blower feedback detection block 236, pulse width modulation output control block 238 and blower ON/OFF delay block 240. The presently preferred indoor fan motor is driven by a pulse width modulation system by which the pulse width of the motor drive signal is varied to modulate the speed. The pulse width modulation output control block 238 and blower feedback detection block 236 provide the pulse width modulated closed-loop system function. The blower ON/OFF delay block 240 alters the ON/OFF sequence of the indoor fan to optimize airflow in relation to the temperature of the heat exchanging elements.

In systems which use auxiliary heat, such as resistance heating elements, the strip heat control block 242 and stage control block 244 are provided. The strip heat control block is responsible essentially for activating one or more relays to turn on the auxiliary heating elements. The stage control block causes the strip heat control block to do so in stages based on the desired temperature and how much heat is required.

The presently preferred embodiment uses a demand defrost cycle to periodically melt accumulated frost on the coil. This is handled by the defrost control block 246. This block 246 is described in more detail in the flowcharts on FIGS. 8A, 8B and 11. Interface between the defrost control block 246 and the outdoor unit 24 takes place through the mainline control block 202, the communications block 216 and the bus block 220. In addition, fan speed may be regulated to control humidity or to maintain system operation within the ASHRAE comfort zone. This is handled by the humidity control block 248.

In reviewing FIG. 11 and FIGS. 4 and 5 it should be kept in mind that the presently preferred inter-unit communication is done via the serial communication link 48. It is the nature of serial communication that the communication line is shared by all units and thus only one message is communicated at a time. Thus in these figures, the itemized data flow between room unit control unit 45 and indoor control unit 46 and between outdoor control unit 44 and indoor control unit 46 are shown to illustrate the type of information which is passed back and forth during system operation. Although this transfer of data is illustrated as a parallel operation, and it could be implemented in a parallel communication link, the present embodiment prefers a serial link.

To transfer this much information back and forth during system operation the microprocessor-based systems send and acknowledge messages in a serial fashion according to a predefined protocol. Each of the three units has sufficient random access memory, and in some cases nonvolatile memory, in which to store the various parameters which comprise the information communicated between them. Thus, for example, the outdoor temperature measured by sensor 56 is stored in the random access memory of outdoor control unit 44, to be thereafter communicated to indoor control unit 46 where it is stored in the random access memory of control unit 46. Thereafter, the same outdoor temperature data may be communicated to the room unit where it is stored in the room unit control unit's random access memory.

The building occupant could then, if desired, enter the appropriate keypad function to request a display of the outdoor temperature. This is but one example of how data flows from module to module. By using interim storage in each of the modules, each module is able to handle its own system critical tasks with high priority, attending to the noncritical tasks only when there is time. Thus the building occupant requesting a display of outdoor temperature would not cause the outdoor module to neglect its task of controlling the compressor and likewise would not cause the indoor unit to neglect its task of regulating the fan speed. The building occupant requesting and outdoor temperature display would see a temperature value displayed instantly, although the value displayed would be the value obtained during the most recent data refresh sequence.

As diagrammatically illustrated in FIGS. 6 and 7, temperature sensor 55 is positioned within the refrigeration system 50, but temperature sensor 56 is positioned in the outside environment 52. In addition temperature sensor 54 measures the compressor discharge temperature used to control the expansion valve setting for steady state operation. Temperature sensor 55 is preferably positioned adjacent to the outdoor coil 16 and accurately measures the temperature of the coil surface. Temperature sensor 56 is preferably positioned in an airflow path which will measure the temperature of the ambient air surrounding or forced across the outdoor coil 16. Placement of this ambient air temperature sensor can be important. The ambient temperature sensor should be positioned so that it will not receive direct sunlight. This may be accomplished by placing the ambient temperature sensor in a tube or enclosure which is open to airflow but shielded from the direct rays of the sun.

FIG. 7 illustrates one manner of shielding the ambient outdoor air temperature sensor 56. As illustrated, sensor 56 is positioned within a tube 58 which is mounted in the housing sidewall of the outdoor unit 24. The tube shields sensor 56 from the direct rays of the sun, as shown, but is open to the atmosphere and to the interior of the housing so that ambient air will flow across sensor 56 under force of outdoor fan 34. The moving airflow produced by fan 34 virtually negates any radiant and conductive heating effects caused by heating of the housing by the sun's radiant energy. The result is an accurate measurement of the ambient air temperature which will be drawn by fan 34 across outdoor coil 32.

Figure 8A:
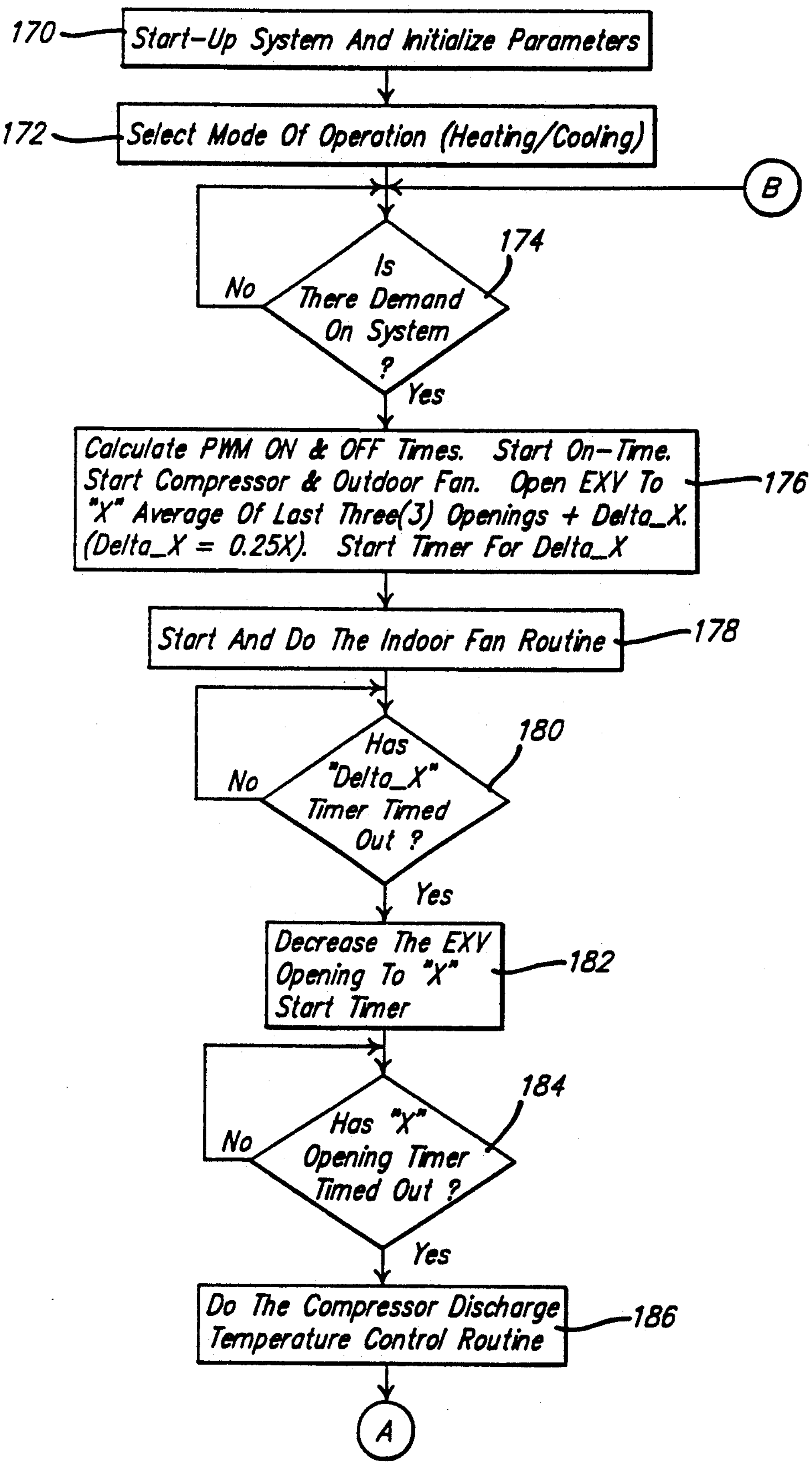
FIGS. 8A and 8B shows a flowchart illustrating the implementation of the improved system start-up strategy of the present invention.
Figure 8B:
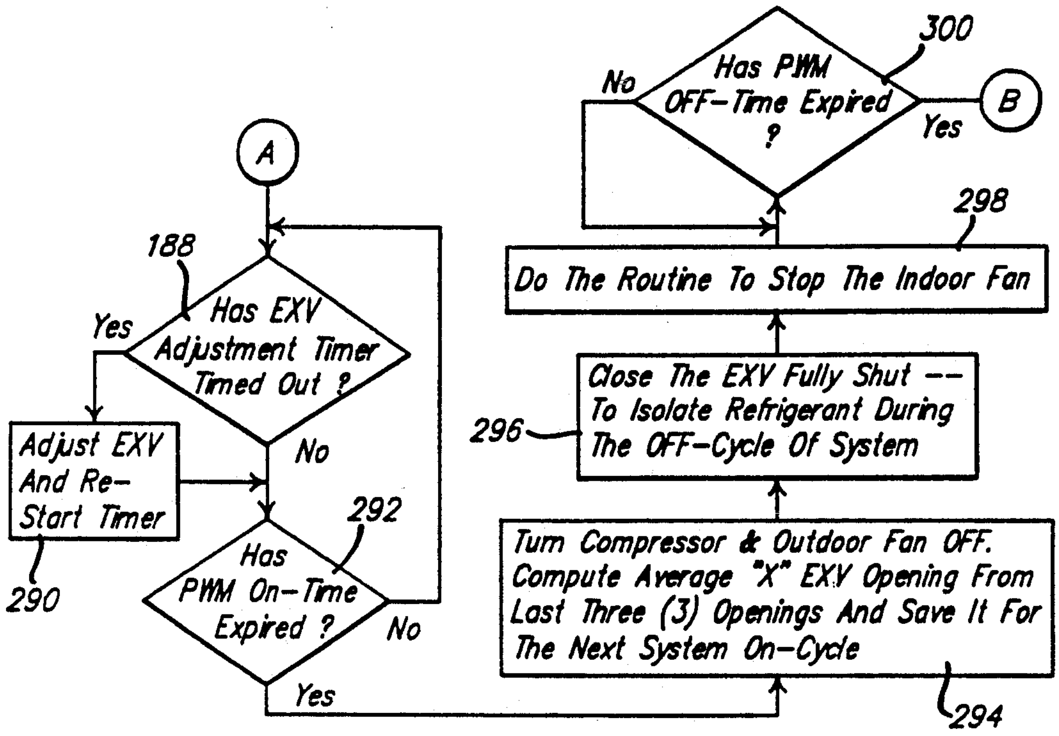

To reduce start-up losses of the system and thereby improve cyclic performance, the present invention implements the energy-saving scheme depicted in FIGS. 8A and 8B. The improved cyclic performance afforded by the process described in FIGS. 8A and 8B may be seen in FIGS. 9 and 10.

Referring to FIGS. 8A and 8B, at steps 170, 172 and 174, when the heating or cooling cycle is to be restarted, parameters are initialized as required. If there is a demand on the system, i.e., the indoor ambient air temperature is not at the preset thermostat temperature, the compressor and outdoor fan are started as a result of steps 174 and 176. The ON/OFF cycling of the system can, in effect, be viewed as pulse width modulation (i.e., ON/OFF modulation).

The presently preferred embodiment implements an ON/OFF cycle every 20 minutes. The length of the ON time is computed using a proportional integral derivative (PID) algorithm to determine the ON time. The OFF time is then calculated (20 minutes minus ON time). The PID algorithm employs a proportional term which is proportional to the difference between the set point temperature and the room temperature. The integral term is a time related term representing the increase or decrease over time. The derivative term reflects the change in temperature between readings. The presently preferred embodiment de-emphasizes the derivative term by setting it equal to 1. These three terms are added to arrive at a value which dictates the ON time. In general, a large value dictates a long ON time and a small value dictates a small ON time. The PID algorithm is preferably implemented in software executed by the microprocessor in the indoor module. For the full details of the presently preferred PID algorithm see the software listing located in Appendix A hereto.

After the ON and OFF times are calculated they are stored to be used as counters as will be explained more fully below. In addition to computing the pulse width modulation ON and OFF times, in step 176 a value is computed for use in determining the degree to which the expansion valve (EXV) is opened.

The presently preferred embodiment uses the arithmetic average of the valve settings used for the last three steady state ON cycles To this average an additional increment or $\Delta X$ is added. The presently preferred embodiment adds a $\Delta X$ sufficient to increase the average by about 25%.

Next, in step 178 the indoor fan routine is initiated. This routine is primarily a fail-safe routine which turns on the indoor fan and then verifies that it is running. If the indoor fan is not running, this could signify an error condition and the system may be shut down.

The expansion valve is initially opened to a setting determined by the average of the last three openings increased by a ΔX factor. The valve remains in this state for a predetermined length of time measured by a ΔX timer in step 180. The presently preferred embodiment leaves the expansion valve in this first setting for approximately 1.5 minutes.

Thereafter, the expansion valve is decreased to a setting equal to the average of the last three valve openings in step 182. This initiates a second timer designated as the X timer. The valve remains in this second setting until the X timer has timed out in step 184 (preferably after approximately 2 minutes). After the X timer has timed out, control of the expansion valve opening is turned over the normal steady state valve control routine at step 186. The presently preferred embodiment controls the expansion valve opening in steady state using the compressor discharge temperature and outdoor ambient air temperature. Of course, other steady state control algorithms may be used.

Figure 12:
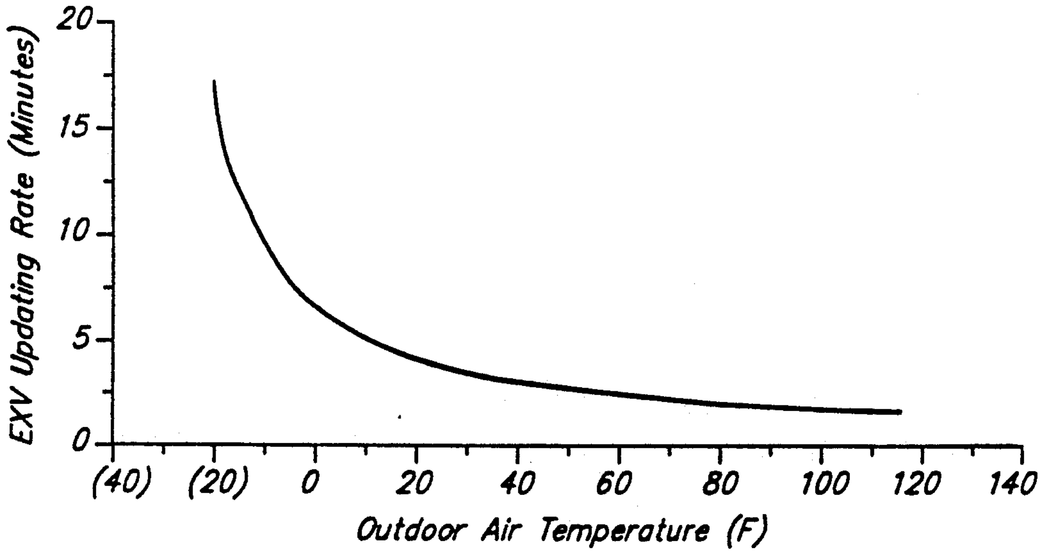
FIG. 12 is a graph of the EXV updating rate as a function of the outdoor air temperature.

Although it is possible to continuously adjust the expansion valve setting during steady state operation, it is not necessary to do so and continuous adjustment may be undesirable in some systems. The presently preferred embodiment checks the compressor discharge temperature and outdoor ambient air temperature every message cycle (about 12 seconds) of the indoor controller. The indoor controller updates the EXV setting based on the scheme shown in FIG. 12. For example, at 95° F. outdoor temperature, the EXV would be updated every 2 minutes whereas at 10° F. outdoor temperature the EXV would be updated every 5 minutes to take the system response into account. A timing loop referred to as the EXV adjustment timer measures these 2 minute intervals. Accordingly, in steps 188 and 290 an EXV adjustment timer is used to allow the expansion valve to be adjusted for a predetermined length of time (the EXV adjustment time) before control is passed to the next step 292. The operature thus remains in the normal steady state control routine, with valve updated according to the scheme shown in FIG. 12, until the pulse width modulation ON time has expired. In step 292 if the pulse width modulation ON time has expired, the compressor and outdoor fan are turned off and a new three cycle average is calculated (see step 294). It will be recalled that the pulse width modulation ON time was computed in step 176.

Once the compressor and outdoor fans are turned off in step 294 the expansion valve is shut fully in step 296. This will isolate the refrigerant charge during the OFF cycle to prevent pressures from equalizing. In so doing system efficiency is greatly improved since the next ON cycle will not require as much energy to be expended bringing pressure levels back up to operating conditions.

After the expansion valve is shut the indoor fan is turned off in step 298 and control is passed to step 300. Control will remain at step 300 until the pulse width modulation OFF time has expired. It will be recalled that the pulse width modulation OFF time was calculated at step 176. Once the pulse width modulation OFF time has expired control returns back to step 174 where it waits until the thermostat dictates there is demand on the system warranting another cycle. Step 300 thus forces the system to wait a predetermined pulse width modulation OFF time before the next ON cycle can proceed, and thus to cycle on a 20 minute interval even if the thermostat is calling for another ON cycle. This lengthens component life by blocking the tendency to respond to minor temperature fluctuations.

Figure 9:
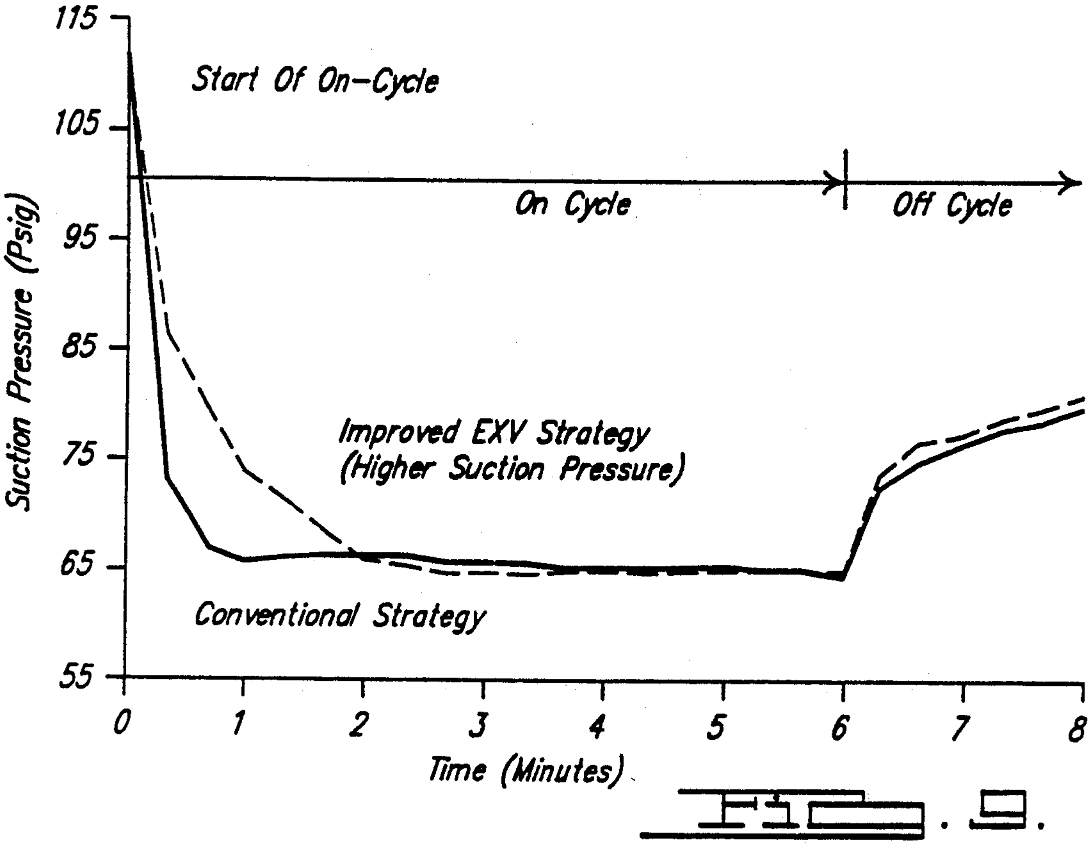
FIG. 9 is a graph of suction pressure versus time depicting the on-cycle performance improvement gained by the improved EXV strategy.
Figure 10:
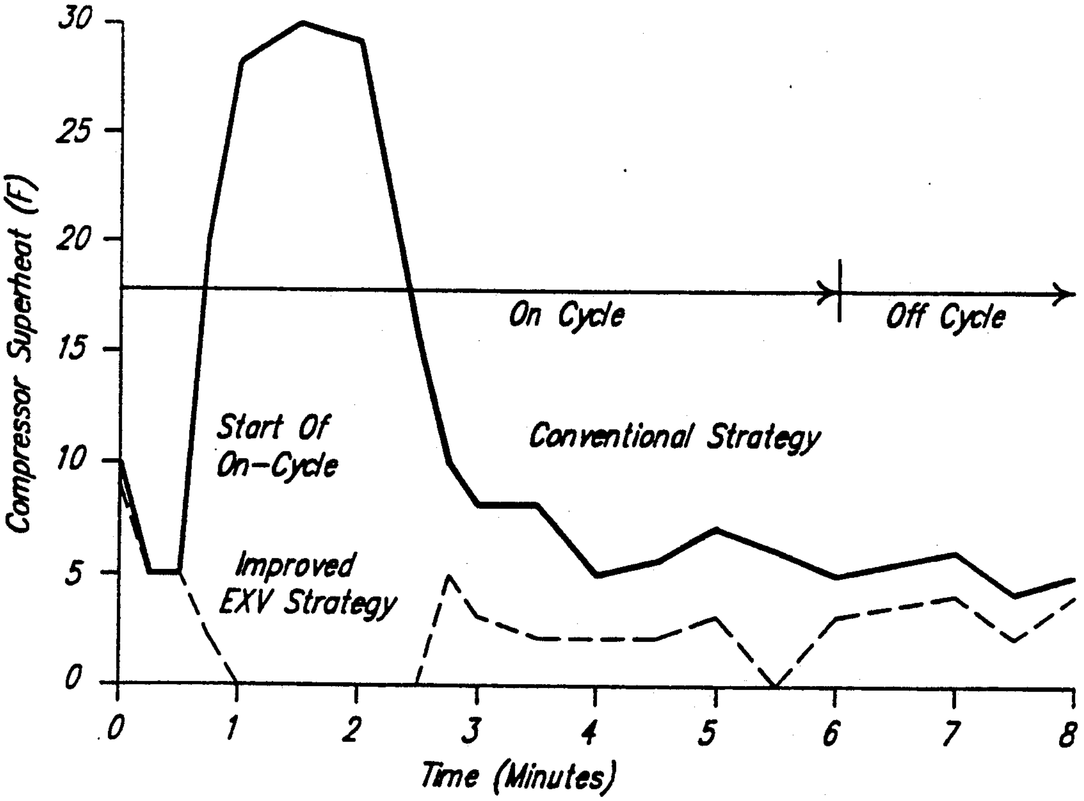
FIG. 10 is a graph of compressor superheat versus time illustrating the performance improvement gained by the present invention.

From the foregoing it is seen that the start-up losses of the system may be lowered by closing the stepper motor electronic expansion valve (EXV) after the compressor cycles off and employing a strategy that raises the suction pressure during the first few minutes of the ON cycle. FIG. 8A and 8B have shown the control logic of such a strategy. FIG. 9 shows the comparison between the suction pressures using fixed opening (conventional strategy) and larger EXV openings (improved strategy) during the ON cycle of the heat pump (HP) operating in the cooling mode. It may be seen the suction pressure with the larger EXV opening (improved strategy) has a higher suction pressure during the initial period of the ON cycle. This increased the refrigerant flow thereby lowering the compressor superheat as opposed to the strategy that used a constant EXV opening during the initial period (refer to FIG. 10). The improved strategy helps in the faster attainment of the capacity yielding an improved system efficiency. Following the initial period the EXV opening is reduced to the average of the last three ON cycle openings. On termination of the first three minutes of operation the control is based on the compressor discharge temperature. After the room thermostat is satisfied the EXV opening is memorized and the valve is moved to the closed position to isolate the refrigerant charge. The control uses the memorized EXV opening to determine the average EXV opening to be used during the next ON cycle. The heating mode ON cycle strategy is similar to the cooling cycle.

While the invention has been described with respect to a presently preferred air conditioner or heat pump embodiment, it will of course be understood that the invention can be applied to numerous forms of air-conditioning, heating and heat pump systems. Accordingly, the principles of the invention are not limited to the embodiment described. The invention is capable of certain modification and change without departing from the spirit of the invention as set forth in the appended claims.

TABLE I

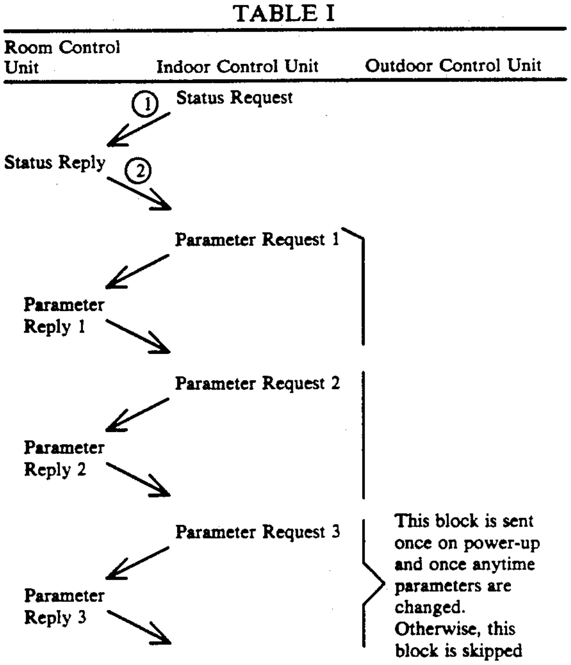

TABLE I-continued

| Room Control Unit | Indoor Control Unit | Outdoor Control Unit |
|---|---|---|
| | Parameter Update 1 | |
| ACK/NAK | | |
| | Parameter Update 2 | |
| ACK/NAK | | |
| | Parameter Update 3 | |

TABLE I-continued

| Room Control Unit | Indoor Control Unit | Outdoor Control Unit |
|---|---|---|
| ACK/NAK | | |
| | Command Update (3) | |
| | | (4) ACK/NAK |
| | Status Request (5) | |
| | | (6) Status Reply |
| | (7) Command Update | |
| ACK/NAK (8) | | |
| | System Status Update (9) | |
| | REPEAT | |

TABLE II

Enhanced Single Speed Message Format For Versions COPE1-27 And Above

| | KEY | | | | | | | | | | | | | | | |
|---|---|---|---|---|---|---|---|---|---|---|---|---|---|---|---|---|
| From Indoor To Thermostat | ① | 81 | 194 | 19 | | | | | | | | | | | | |
| From Thermostat To Indoor | ② | 21 | 66 | 80 HUM SETPT | 70 HUM % | INVSPD 13 HR | OUTFAN 5 MIN | 76 TEMP WHOLE | 176 TEMP FRACT | 76 SETPT | STPHT 64 NXTPRG TIME | EEVPOS 70 NXTPRG STPT | BLWR SPD 0 BLWR SPD | 0 DIAG MODE | 98 FLAG | MANUAL MODE 47 NORMAL MODE |
| From Indoor to Outdoor | ③ | 92 | 131 | 0 | 0 CONFG | 0 MODE | 0 INV FRQ | 0 FAN SPD | 0 | 0 | 0 | 0 | 0 | 0 | 0 | 223 |
| From Outdoor to Indoor | ④ | 197 | 6 | 203 | (Acknowledge; Above Message Received Okay) | | | | | | | | | | | |
| From Indoor To Outdoor | ⑤ | 92 | 195 | 31 | | | | | | | | | | | | |
| From Outdoor To Indoor | ⑥ | 197 | 67 | 0 | 0 MODE | 0 INV FRQ | 0 MALF | 0 | 0 SUCT TEMP | 115 DSCH TEMP +55 | 149 OTDR AMB −77 | 142 OTDR COIL1 −77 | 0 OTDR COIL2 | 0 CRNT | 0 OTDR % HUM | 158 |
| From Indoor To Thermostat | ⑦ | 81 | 130 | 0 SETPT OVRIDE | 0 | | 0 | 0 | 0 FLAG | 0 DIAG | 0 | 0 | 0 COMP SPD | 149 OTDR AMB | 0 OTDR % HUM | 104 |
| From Thermostat To Indoor | ⑧ | 21 | 6 | 27 | | | | | | | | | | | | |
| From Indoor | ⑨ | 80 | 129 | 0 | 0 | 0 | 0 EEV POS | 0 BLWR SPD | 0 STRP HT | 53 OUT PID | 15 PWM OFF TIME | 5 PWM ON TIME | 0 | 255 PID TERM | 0 DERFLAG | 25 |

| | |
|---|---|
| 64 BIT | 6 MALFUNCTION |
| 32 | 5 MODE ECHO |
| 16 | 4 MODE ECHO |
| 4 | 2 AUX HT |
| 2 | 1 DEFROST |
| 1 | 0 LOCKOUT |

| | |
|---|---|
| 128 BIT | 7 MNUL MODE=1/NORM=0 |
| 64 | 6 PWR UP=0/KEY PRES=1 |
| 32 | 5 CMFT=1/ECON=0 |
| 16 | 4 PARAMETER SETUP=1 |
| 8 | 3 BLOWER ON=1 |
| 4 | 2 LOCKOUT OVRIDE=1 |
| 2 | 1 0 0 1 1 MODE |
| 1 | 0 0 1 0 1 MODE |

OFF COOL HEAT EMER

DERFLAG (key ⑨):

| | |
|---|---|
| 18 BIT | 3 DIAGNOSTICS |
| 4 | 2 DEFROST |
| 2 | 1 RU COMM ERROR |
| 1 | 0 OD COMM ERROR |

TABLE III

| | |
|---|---|
| HUM SET PT | Humidity Set Point |
| HUM % | Measured Indoor Relative Humidity (times 2) |
| INV SPD | Inverter Speed (0 = off; 200 = on) |
| OUT FAN | Outdoor Fan Speed (0 = off; 100 = low; 200 = high) |
| STP HT | Number of Levels of Resistance Heat On |
| EEV POS | Electronic Expansion Valve Open Position |
| BLWR SPD | Indoor Blower Speed |
| CHECK SUM | Sum (modulo 256) of Numbers in Message |
| HR | Hour of Day |
| MIN | Minute of Day |
| TEMP WHOLE | Measured Room Temperature Whole Number |
| TEMP FRACT | Measured Room Temperature Fractional Part |
| SET PT | Thermostat Set Point |
| NXT PRG TIME | Next Programmed Set Point Change Time |
| NXT PRG ST PT | Next Programmed Set Point |
| BLWR SPD | Indoor Blower Speed in Fan ON Mode |
| DIAG MODE | Diagnostic Mode Number |
| MNUL MODE | Manual Mode |
| NORM | Normal Running Mode |
| PWR UP | Power Up |
| KEY PRES | Key Pressed |
| CMFT | Comfort Mode |
| ECON | Economy Mode |
| PARAMETER SETUP | Parameter Setup Mode |
| BLOWER ON | Blower in Fan ON Mode |
| LOCKOUT OVRIDE | Compressor Lockout Time Override |
| MODE | Off Cool Heat or Emer Operating Mode |
| CONFIG | Outdoor Configuration |
| MODE | Operating Mode of Outdoor Unit |
| INV FRQ | Inverter Frequency (Compressor ON or OFF) |
| MALF | Outdoor Malfunction Codes |
| SUCT TEMP | Suction Temperature |
| DSCH TEMP | Discharge Temperature |
| OTDR AMB | Outdoor Ambient Temperature |
| OTDR COIL1 | Outdoor Coil Temperature #1 |
| OTDR COIL2 | Outdoor Coil Temperature #2 |
| CRNT | Compressor Current |
| OTDR % HUM | Outdoor Percent Relative Humidity |
| ST PT OVRIDE | Set Point Override |
| DIAG | Diagnostic Mode Number |
| COMP SPD | Compressor Speed (ON/OFF) |
| OTDR AMB | Outdoor Ambient Temperature |
| OTDR % HUM | Outdoor Percent Relative Humidity |
| MALFUNCTION | System Operating Under a Malfunction |
| MODE ECHO | System Mode (Heat, etc.) Echoed to Thermostat |
| AUX HT | Resistance Strip Heat ON/OFF |
| DEFROST | Running Defrost Routine |
| LOCKOUT | Compressor in Lockout Time |
| EEV POS | Electronic Expansion Valve Open Position |
| BLWR SPD | Indoor Blower Speed |
| STRP HT | Number of Strip Heat Levels ON |
| OUT PID | PID Control Value |
| PWM OFF TIME | Minutes Strip Heat or Compressor OFF in Cycle |
| PWM ON TIME | Minutes Strip Heat or Compressor ON in Cycle |
| PID DER TERM | Value of Derivative Term of PID Value |
| DIAGNOSTICS | System in Diagnostics Mode |
| DEFROST | System in Defrost Mode |
| RU COMM ERROR | Communication Fault Between Indoor & Thermostat |
| OD COMM ERROR | Communication Fault Between Indoor & Outdoor |

Note:
In message 2 the top set of abbreviations describe the numbers shown when the system is in manual mode. The lower set of abbreviations describe the numbers in normal running mode.

APPENDIX A

```
                GLOBAL      PID, INIT_PID, RESUME_PID

;FROM NOVRAM.ASM -- NOVRAM (READ_24C01) STORES MULTIPLIER
                    VALUES
;                   CLEAR_NV_TIMEOUT CHECKS TO SEE IF NOVRAM
                    IS WORKING OK
;
                EXTERN      READ_24C01, CLEAR_NV_TIMEOUT
;FROM MATH.ASM  --  MATH ROUTINES USED TO DO ARITHMETIC (16
                    BIT)
;
                EXTERN      ADDS16, ADCS16, SUBS16, MULS16,
     DIVS16, NEGATE
;FROM CLOCK.ASM -- MASTER CLOCK FOR TIMING ALL EVENTS
;
                EXTERN      GET_TIME

;*************************************************************
; PID CONTROL ALGORITHIM
;   GRF = Td    TIME DERIVITIVE
;   GRE = Kr    RESET RATE
;   GRD = PB    PROPORTIONAL BAND
;*************************************************************/
PID:
     JSR  SET_PID    ;GET PID CONSTANTS FOR CURRENT MODE
;COMPUTE DEL_T
     JSR  GET_TIME
```

```
        STX  GRA
        STA  GRB          ;GRA:GRB = TIME
        STX  GR0
        STA  GR1          ;GR0:GR1 = TIME

        LDA  T_PID
        STA  GR2
        LDA  T_PID+1
        STA  GR3          ;GR2:GR3 = T_PID

        JSR  SUBS16       ;GR0:GR1 = (TIME-T_PID)

        LDA  #>SECONDS
        STA  GR2
        LDA  #<SECONDS
        STA  GR3          ;GR2:GR3 = SECONDS

        JSR  DIVS16       ;GR4:GR5 = [(TIME-T_PID)]/SECONDS = DEL_T


        LDA  GRA
        STA  T_PID
        LDA  GRB
        STA  T_PID+1      ;T_PID = TIME
        LDA  GR5
        STA  GRB          ;GRB = DEL_T


;EXTEND PB TO 16 BITS

        CLR  GRC
        LDA  GRD          ;ACC = PB
                          ;JUMP IF HEAT MODE.
      BRCLR RU_COOL,FLAGS2,?HEAT
        DEC  GRC          ;NEGATE PB, UPPER BYTE.
        COMA              ;2'S COMPLEMENT OF LOWER BYTE.
        INCA
?HEAT:
        STA  GRD          ;GRC:GRD = PB

;COMPUTE ERROR
        LDA  SETP
        JSR  TIMES_16
        STX  GR0
        STA  GR1          ;GR0:GR1 = (SETP*16)
        LDA  RT
        STA  GR2
        LDA  RT+1
        STA  GR3          ;GR2:GR3 = RT
        JSR  SUBS16       ;GR0:GR1 = [(SETP*16) - RT] = ERR
        LDA  GR0
        STA  GR7
        LDA  GR1
        STA  GR8          ;GR7:GR8 = [(SETP*16) - RT] = ERR

;COMPUTE I_TERM
      BRSET LOCK_I_TERM,FLAGS7,?I_SKIP; FLAG SET FOR
                                        ; 20 MINUTES ANY TIME
                                        ; SET POINT IS CHANGED
```

```
     CLR   GR2
     LDA   GRB          ;GR2:GR3 = DEL_T
     STA   GR3
     JSR   MULS16       ;GR4:GR5 = ERR * DEL_T

     LDA   GR4
     STA   GR0
     LDA   GR5
     STA   GR1          ;GR0:GR1 = ERR * DEL_T

     CLR   GR2
     LDA   GRE
     STA   GR3          ;GR2:GR3 = Kr
     JSR   MULS16       ;GR4:GR5 = Kr * (ERR * DEL_T)

     LDA   GR5
     ADD   I_TERM+3
     STA   I_TERM+3     ;ACCUMULATE I_TERM BYTE 0.
     CLR   GR2          ;SIGN EXTEND IF NECESSARY.
     LDA   GR4
     BPL   ?POS_INT     ;JUMP IF POSITIVE INTEGRAL ADJUSTMENT.
     DEC   GR2          ;SIGN EXTEND NEGATIVE ADJUSTMENT.
?POS_INT:
     ADC   I_TERM+2
     STA   I_TERM+2     ;ACCUMULATE I_TERM BYTE 1.

     LDA   I_TERM
     STA   GR0
     LDA   I_TERM+1     ;GR0:ACC = I_TERM UPPER WORD.
     ADC   GR2          ;ADD BYTE 1 CARRY TO BYTE 2.
     JSR   ADCS16       ;ADD CARRY TO I_TERM UPPER WORD.

     LDA   GR0
     STA   I_TERM
     LDA   GR1
     STA   I_TERM+1     ;I_TERM = I_TERM + (Kr * ERR * DEL_T)

;PREVENT RESET WINDUP

     LDA   I_TERM
     STA   GR10
     LDA   I_TERM+1
     STA   GR11         ;GR10:GR11 =  (I_TERM/65536)
     LDX   #GR10
     JSR   NEGATE       ;GR10:GR11 = -(I_TERM/65536)

     LDA   #>I_TERM_MIN
     STA   GR2
     LDA   #<I_TERM_MIN
     STA   GR3          ;GR2:GR3 = I_TERM_MIN
     JSR   GET_LIMIT    ;COMPUTE ACTUAL I_TERM LIMIT.
     JSR   CHK_LO_LIM   ;HAS THE NEGATIVE LIMIT BEEN EXCEEDED?
     BMI   ?SET_I_LIM   ;YES, THEN JUMP.

     LDA   #>I_TERM_MAX
     STA   GR2
     LDA   #<I_TERM_MAX
     STA   GR3          ;GR2:GR3 = I_TERM_MAX
     JSR   GET_LIMIT    ;COMPUTE ACTUAL I_TERM LIMIT.
```

```
    JSR  CHK_HI_LIM ;HAS THE POSITIVE LIMIT BEEN EXCEEDED?
     BPL  ?I_OK       ;NO, THEN JUMP.
?SET_I_LIM:
     LDA  GR2
     STA  I_TERM
     LDA  GR3
     STA  I_TERM+1
     CLR  I_TERM+2
     CLR  I_TERM+3    ;SET I_TERM TO LIMIT.
?I_OK:
?I_SKIP:
;COMPUTE D_TERM
     CLR  D_TERM
     CLR  D_TERM+1    ;ASSUME NO D_TERM
     LDA  GRB         ;GRB = DEL_T
    BEQ  ?NO_D_TERM ;JUMP IF DEL_T = 0
     LDA  RT_OLD
     ORA  RT_OLD+1
    BEQ  ?NO_D_TERM ;JUMP IF RT_OLD = 0

     LDA  RT_OLD
     STA  GR0
     LDA  RT_OLD+1
     STA  GR1         ;GR0:GR1 = RT_OLD
     LDA  RT
     STA  GR2
     LDA  RT+1
     STA  GR3         ;GR2:GR3 = RT
     JSR  SUBS16      ;GR0:GR1 = RT_OLD - RT
     CLR  GR2
     LDA  GRF
     STA  GR3         ;GR2:GR3 = TD
     JSR  MULS16      ;GR4:GR5 = (RT_OLD-RT)*TD

     LDA  GR4
     STA  GR0
     LDA  GR5
     STA  GR1         ;GR0:GR1 = (RT_OLD-RT)*TD
     LDA  #>25
     STA  GR2
     LDA  #<25
     STA  GR3         ;GR2:GR3 = 25
     JSR  MULS16      ;GR4:GR5 = 25*(RT_OLD-RT)*TD
     LDA  GR4
     STA  GR0
     LDA  GR5
     STA  GR1         ;GR0:GR1 = 25*(RT_OLD-RT)*TD
     CLR  GR2
     LDA  GRB
     STA  GR3         ;GR2:GR3 = DEL_T
     JSR  DIVS16      ;GR4:GR5 = (25*(RT_OLD-RT)*TD)/DEL_T

     LDA  GR4
     STA  GR0
     LDA  GR5
     STA  GR1         ;GR0:GR1 = (25*(RT_OLD-RT)*TD)/DEL_T
     LDA  #>(25*PERCENT/10)
     STA  GR2
     LDA  #<(25*PERCENT/10)
```

```
     STA  GR3          ;GR2:GR3 =2.5 * %
     JSR  MULS16       ;GR4:GR5 =2.5%*(25*(RT_OLD-RT)*TD)/DEL_T
     LDA  GR4
     STA  D_TERM
     LDA  GR5
     STA  D_TERM+1    ;D_TERM = 2.5%*(25*(RT_OLD-RT)*TD)/DEL_T
?NO_D_TERM:

;COMPUTE PID_OUT
     LDA  GR7
     STA  GR0
     LDA  GR8
     STA  GR1          ;GR0:GR1 = ERR
     LDA  I_TERM
     STA  GR2
     LDA  I_TERM+1
     STA  GR3          ;GR2:3 = I_TERM / 65536
     JSR  ADDS16       ;GR0:1 = ERR + (I_TERM / 65536)

     LDA  #>(625*PERCENT/10)
     STA  GR2
     LDA  #<(625*PERCENT/10)
     STA  GR3          ;GR2:GR3=62.5%
     JSR  MULS16       ;GR4:GR5=62.5%*[ERR+(I_TERM/65536)]

     LDA  GR4
     STA  GR0
     LDA  GR5
     STA  GR1          ;GR0:GR1=62.5%*[ERR+(I_TERM/65536)]

     LDA  D_TERM
     STA  GR2
     LDA  D_TERM+1
     STA  GR3          ;GR2:GR3 = D_TERM
     JSR  ADDS16       ;GR0:1=62.5%*[ERR+(I_TERM/65536)]+D_TERM

     LDA  GRC
     STA  GR2
     LDA  GRD
     STA  GR3          ;GR2:GR3 = PB
                       ;GR4:5=62.5%*[ERR+(I_TERM/65536)]+D_TERM
     JSR  DIVS16       ;---------------------------------------
                       ;                 PB

     LDA  GR4
     STA  PID_OUT
     LDA  GR5
     STA  PID_OUT+1 ;PID_OUT = GR4:5

     LDA  RT
     STA  RT_OLD
     LDA  RT+1
     STA  RT_OLD+1   ;RT_OLD = RT

; LIMIT PID_OUT

     LDA  PID_OUT
     STA  GR10
     LDA  PID_OUT+1
```

```
     STA  GR11        ;GR10:GR11 = PID_OUT
     LDX  #GR10
     JSR  NEGATE      ;GR10:GR11 = -PID_OUT

     LDA  #>PID_MIN
     STA  GR2
     LDA  #<PID_MIN
     STA  GR3         ;GR2:GR3 = PID_MIN
    JSR  CHK_LO_LIM ;HAS LO LIMIT BEEN EXCEEDED?
    BMI ?SET_PIDLIM ;YES, THEN JUMP.

     LDA  #>PID_MAX
     STA  GR2
     LDA  #<PID_MAX
     STA  GR3         ;GR2:GR3 = PID_MAX
    JSR  CHK_HI_LIM ;HAS HI LIMIT BEEN EXCEEDED?
    BPL  ?SET_PIDOUT;NO, THEN JUMP.

?SET_PIDLIM:
     LDA  GR2
     STA  PID_OUT
     LDA  GR3
     STA  PID_OUT+1 ;PID_OUT = PID_LIMIT (MIN OR MAX)
?SET_PIDOU
     RTS

;*************************************************************
;
;   CONVERTS I_TERM_LIMIT INTO UNITS COMPATIBLE WITH I_TERM.
;
;   ARGUMENTS:  GR2:GR3 = LIMIT
;
;   RETURNS:    GR2:GR3 = CONVERTED LIMIT
;
;   REGISTERS:  GR0 - GR5, GR9
;
;*************************************************************/

GET_LIMIT:

     LDA  GRC
     STA  GR0
     LDA  GRD
     STA  GR1         ;GR0:GR1 = PB
                      ;JUMP IF HEAT MODE.
    BRCLR RU_COOL,FLAGS2,?GL1
     LDX  #GR0        ;COOL MODE.
     JSR  NEGATE      ;USE POSITIVE PB.
?GL1:
     JSR  MULS16      ;GR4:GR5 = PB * I_TERM_LIMIT
     LDA  GR4
     STA  GR0
     LDA  GR5
     STA  GR1         ;GR0:GR1 = PB * I_TERM_LIMIT

     LDA  #>(625*PERCENT/10)
     STA  GR2
     LDA  #<(625*PERCENT/10)
     STA  GR3         ;GR2:GR3=62.5%
     JSR  DIVS16      ;GR4:GR5 = PB * I_TERM_LIMIT / 62.5%
```

```
     LDA  GR4
     STA  GR2
     LDA  GR5
     STA  GR3          ;GR2:3 = CONVERTED I_TERM_LIMIT

     RTS


;***************************************************************
;
;   ARGUMENTS:   GR10:GR11 = -VARIABLE
;                GR2:GR3   = LIMIT
;
;   RETURNS:     SIGN FLAG = MINUS IF LIMIT EXCEEDED.
;
;**************************************************************/

CHK_HI_LIM:
     LDA  GR10
     STA  GR0
     LDA  GR11
     STA  GR1          ;GR0:GR1 = -VARIABLE
     JSR  ADDS16       ;GR0:GR1 = HI_LIMIT - VARIABLE
     LDA  GR0          ;HAS THE POSITIVE LIMIT BEEN EXCEEDED?
     RTS

CHK_LO_LIM:
     LDA  GR10
     STA  GR0
     LDA  GR11
     STA  GR1          ;GR0:GR1 = -VARIABLE
     JSR  ADDS16       ;GR0:GR1 = LO_LIMIT - VARIABLE
     LDA  GR0          ;HAS THE NEGATIVE LIMIT BEEN EXCEEDED?
     BPL  ?LO_EQ       ;YES OR =, THEN JUMP.
?NOT_LO:
     CLRA              ;CLEAR SIGN BIT, LIMIT NOT EXCEEDED.
     RTS
?LO_EQ:
     ORA  GR1          ;DOES I_TERM = NEGATIVE LIMIT?
     BEQ  ?NOT_LO      ;YES, THEN JUMP.
     LDA  #80H         ;SET SIGN FLAG, LIMIT EXCEEDED.
     RTS

;***************************************************************
; PID INITIALIZATION. RESETS ALL PID TERMS AND TIMERS
;**************************************************************/
INIT_PID:
     CLR  I_TERM
     CLR  I_TERM+1
     CLR  I_TERM+2
     CLR  I_TERM+3
     CLR  D_TERM
     CLR  D_TERM+1
     CLR  PID_OUT
     CLR  PID_OUT+1
```

```
;***************************************************************
; RESUME_PID
;**************************************************************/
RESUME_PID:
     LDA  RT         ;RESET OLD ROOM TEMPERATURE
     STA  RT_OLD
     LDA  RT+1
     STA  RT_OLD+1
     JSR  GET_TIME   ;RESET PID SAMPLE TIMER
     STA  T_PID+1
     STX  T_PID
                     ;INIT STAGE CONTROL STATE.
     BSET CTL_PWM_ON,FLAGS1
     LDA  MINUTE+1
     STA  T_CTL_PWM ;INITIALIZE PWM CONTROL CYCLE.

     RTS

;***************************************************************
; MULTIPLY VALUE IN A * 16
; ARGS:      A       - INPUT VALUE
; RETURNS:  X:A      - INPUT VALUE * 16
;**************************************************************/
TIMES_16:
     CLRX
     ASLA
     ROLX
     ASLA
     ROLX
     ASLA
     ROLX
     ASLA
     ROLX
     RTS

;***************************************************************
; READS PID CONSTANTS FROM NOVRAM BASED ON CURRENT MODE
;    GRF = Td     TIME DERIVITIVE
;    GRE = Kr     RESET RATE
;    GRD = PB     PROPORTIONAL BAND
;**************************************************************/
SET_PID:
     CLRX                ;ASSUME AUX_HEAT MODE
     LDA  AUX_HEAT       ;VERIFY AUX_HEAT MODE
     AND  #HEATER_REQ
     BNE  ?GET_CON       ;JUMP IF HEATERS BEING REQUESTED

     INCX                ;ASSUME COOL MODE
                         ;JUMP IF ACTUALY IN COOL MODE
    BRSET RU_COOL,FLAGS2,?GET_CON

     INCX                ;IN HEAT MODE

?GET_CON:
     LDA  MODE_TAB,X     ;START READING NOVRAM AT PB
     LDX  #3
     STX  GR0            ;READ 3 BYTES FROM NOVRAM
     LDX  #GRD           ;STORE STARTING AT GRD
     JSR  READ_24C01     ;GET BYTES FROM NOVRAM
```

```
                    ;CLEAR NV_TIMEOUT IF NECESSARY.
    JSR   CLEAR_NV_TIMEOUT
    RTS

MODE_TAB:
    DB    NPBA, NPBC,NPBH

    .ENDS
    .END
```

What is claimed is:

1. A method of improving cyclic performance in a heat pump system of the type employing an expansion valve capable of adjustably opening and closing to different orifice sizes to meter refrigerant between a condenser and an evaporator, comprising:

operating said heat pump system at steady state and causing the expansion valve to be adjusted to an opening in response to thermal demands on the heat pump system;

storing a value indicative of the average opening of said expansion valve at steady state;

terminating steady state operation by closing said expansion valve sufficient to substantially maintain a pressure differential between said evaporator and said condenser;

resuming operation by adjusting said expansion valve for a first predetermined time to an opening greater than said average opening;

further adjusting said expansion valve for a second predetermined time to an opening generally equal to said average opening.

2. The method of claim 1 wherein said value indicative of the average opening represents the arithmetic average over a predetermined number of ON/OFF operating cycles of said heat pump system.

3. The method of claim 1 wherein said step of operating said heat pump system at steady state is performed for a third predetermined time.

4. The method of claim 1 wherein said step of terminating steady state operation is performed by fully closing said expansion valve.

5. The method of claim 1 wherein said step of operating said heat pump system at steady state is performed by adjusting the opening of said expansion valve based on sensing at least one thermodynamic property of said refrigerant.

6. The method of claim 1 wherein said step of operating said heat pump system at steady state is performed by adjusting the opening of said expansion valve based temperature of said refrigerant.

7. The method of claim 1 wherein said heat pump system employs a compressor and wherein said step of operating said heat pump system at steady state is performed by adjusting the opening of said expansion valve based temperature of said refrigerant discharged from said compressor.

8. An improved heat pump system, comprising:

a condenser and an evaporator coupled together in fluid circuit;

an expansion valve coupled in said fluid circuit and capable of adjustably opening and closing to different orifice sizes to meter refrigerant between a condenser and an evaporator, comprising:

steady state control means for operating said heat pump system at steady state and for causing the expansion valve to be adjusted to an opening in response to thermal demands on the heat pump system;

data storage means for storing a value indicative of the average opening of said expansion valve at steady state;

cyclic control means for terminating steady state operation by closing said expansion valve to a setting sufficient to substantially maintain a pressure differential between said evaporator and said condenser;

said cyclic control means including timing means for resuming operation by adjusting said expansion valve for a first predetermined time to an opening greater than said average opening and for further adjusting said expansion valve for a second predetermined time to an opening generally equal to said average opening.

9. The system of claim 8 further comprising means for computing the arithmetic average valve opening over a predetermined number of ON/OFF operating cycles of said heat pump system.

10. The system of claim 8 wherein said timing means further causes said heat pump system to operate at steady state for a third predetermined time.

11. The system of claim 8 wherein said cyclic control means terminates steady state operation by fully closing said expansion valve.

12. The system of claim 8 wherein said steady state control means operates by adjusting the opening of said expansion valve based on sensing at lest one thermodynamic property of said refrigerant.

13. The system of claim 8 wherein said steady state control means operates by adjusting the opening of said expansion valve based temperature of said refrigerant.

14. The method of claim 8 further comprising a compressor and wherein said steady state control means operates by adjusting the opening of said expansion valve based temperature of said refrigerant discharged from said compressor.

* * * * *

UNITED STATES PATENT AND TRADEMARK OFFICE

CERTIFICATE OF CORRECTION

PATENT NO. : 5,303,562

DATED : April 19, 1994

INVENTOR(S) : Vijay Bahel; Hank Millet; Mickey Hickey; Hung Pham; Gregory P. Herroon It is certified that error appears in the above-indentified patent and that said Letters Patent is hereby corrected as shown below:

Column 2, line 24, "shows" should be -- show --.

Column 8, line 60, after "cycles" insert -- . --.

Column 32, line 51, "lest" should be -- least --.

Signed and Sealed this

Twenty-third Day of August, 1994

*Attest:*

BRUCE LEHMAN

*Attesting Officer*

*Commissioner of Patents and Trademarks*